Jan. 23, 1951  J. R. GELZER  2,539,015
POWER SUPPLY AND CHARGER CIRCUIT
Filed Jan. 8, 1947
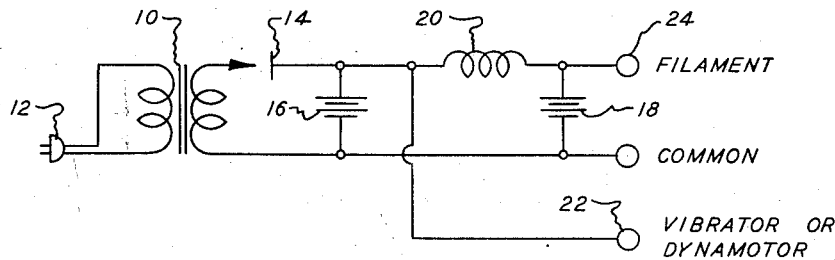
FIG. I.
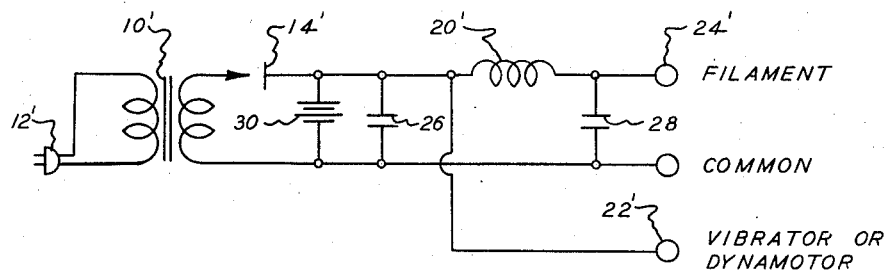
FIG. II.
Inventor
JOHN R. GELZER
By Beaman + Patch
Attorneys Patented Jan. 23, 1951

2,539,015

UNITED STATES PATENT OFFICE 2,539,015

POWER SUPPLY AND CHARGER CIRCUIT

John R. Gelzer, Jackson, Mich., assignor to Eltron, Inc., a corporation of Michigan Application January 8, 1947, Serial No. 720,843

5 Claims. (Cl. 171—97)

This invention relates to electrical power supply systems, and specifically to improvements which provide filtering to reduce noise levels, current fluctuation dampening, and reactivation of primary power sources. In operating radio, electrical or electronic equipment from primary batteries, it is frequently necessary to supply primary power, both to a filament circuit and to a dynamotor or vibrator device which will amplify the primary voltage to a higher voltage level. The vibrator or dynamotor used in this way will usually impose A. C. fluctuations on the primary batteries due to the intermittent nature of the current drawn. This A. C. fluctuation will produce interference noises in the filament circuit to such an extent that it is necessary to provide filtering between the terminals supplying primary power to the dynamotor or vibrator and the terminals supplying filament power.

An object of this invention is to provide a power supply and charger circuit which will supply a well stabilized and filtered direct voltage for the operation of sensitive electrical equipment.

A further object is to provide a power supply and charger circuit which will allow the use of a charging current derived from a transformer and rectifier, or any other source of charging current, to reactivate, recharge or to furnish supplementary current to the primary batteries without transmitting current fluctuations to the point or terminal supplying filament power.

A still further object is to provide a power supply and charger circuit which will assure that both primary output voltages will be regulated and free of any voltage fluctuations which might result from operation of the charging system alone without the stabilizing influence of the primary batteries.

In the drawings,

Fig. I shows an example of a circuit embodying the invention showing the use of two batteries as filter elements, and Fig. II shows an example of a circuit embodying the invention utilizing a single battery and separate filter condensers.

Referring to the drawings, a transformer 10 is supplied with power from a domestic or outside power source 12. The output of the transformer 10 is rectified by a selenium or copper oxide rectifier 14 before the said output enters primary battery 16, so that pulses of direct current are supplied to primary battery 16 and battery 18. Primary power for a vibrator or dynamotor 22 is taken from battery 16. An impedance 20, which may be an inductance, as shown, or a resistance, is connected between battery 16 and battery 18, to prevent the transmission of A. C. fluctuations from battery 16 to battery 18. In this respect the impedance 20 and batteries 16 and 18 are used as elements of a filter network. The filament 24 is then supplied with filament power from battery 18.

Through the use of this circuit, fluctuations in the voltage of battery 16, which result from the intermittent nature of either the charging current supplied by the transformer 10 and rectifier 14, or the load current drawn by the external vibrator or dynamotor 22, will be filtered by the series impedance 20 and the regulation resistance of battery 18. These fluctuations will not, then, be transmitted to the external filament circuit.

The output voltages delivered by the power supply and charger circuit will depend largely on the voltage condition of battery 16 and battery 18, and will therefore be partly independent of line voltage fluctuations occurring on the primary of the transformer 10 or of fluctuations occurring in any other charging device. The power supply will deliver output voltages even when the transformer 10 is not energized from outside power sources, and in the absence of any other charging means. In such a case, all of the external power is supplied by battery 16 and battery 18. There is a distinct advantage in portable equipment utilizing a power supply of this type, for the batteries 16 and 18 may be made much smaller, lighter, and cheaper, while maintaining the same performance level, since the batteries may be frequently reactivated or recharged whenever domestic or other outside power sources are available.

Fig. II shows a suggested variation of my power supply and charger circuit, wherein the transformer 10' is supplied with power from the outside source 12', the output of transformer 10' being rectified by a selenium or copper oxide rectifier before this output enters battery 30. Hooked into the circuit following battery 30 is a filter condenser 26, following which the power is taken off for the vibrator or dynamotor 22'. The impedance 20', which again may be an inductance or a resistance, is connected between filter condenser 26 and a following filter condenser 28 in the circuit which provides filtered power to the filament 24'. In this application, battery 16 and battery 18 of Fig. I have been replaced by filter condensers 26 and 28 which perform the same filter function. The single battery 30 furnishes the sterilizing action necessary in this circuit.

I have likewise found that the variation shown in Fig. II may be even further simplified by the elimination of filter condenser 26 when battery 30 is to be used both for stabilizing purposes and as a filter element. In this arrangement, battery 30 will filter enough of the line voltage fluctuations so that filter condenser 28 is able to filter the remainder, giving results which are substantially equal to those obtained when filter condenser 26 is used.

Having thus described my invention, what I claim as new and desire to cover by Letters Patent is:

1. A power supply comprising means adapted to be energized from an unfiltered power supply, an electrical energy storage device, a circuit for connecting said means across said device whereby said device may receive energy from such supply, a filtering network comprising an impedance element having a pair of terminals, and a second electric energy storage device having a pair of terminals, one of each of said pair of terminals being connected together and adapted to supply one conductor of a load circuit, a second of said impedance element terminals being connected to said first named device, circuit means connecting the other of said second device terminals with said first named device, and a second load circuit connected in unfiltered relationship to said impedance device second terminal whereby voltage pulsations occasioned in said second load circuit will not be transmitted to said first named load circuit.

2. The invention as defined in claim 1 wherein said first electrical storage device consists of a battery.

3. The invention as defined in claim 1 wherein said first electrical storage device consists of a battery and said second electrical energy storage device consists of a condenser.

4. The invention as defined in claim 1 wherein said impedance element consists of an inductive impedance.

5. The invention as defined in claim 1 wherein said means adapted to be energized from the unfiltered power supply comprises a transformer in association with a rectifier included between the transformer secondary and a battery, said battery constituting said first electrical energy storage device.

JOHN R. GELZER.

REFERENCES CITED

The following references are of record in the file of this patent:

UNITED STATES PATENTS

| Number | Name | Date |
| --- | --- | --- |
| 968,896 | Thomas | Aug. 30, 1910 |
| 1,613,949 | Heising | Jan. 11, 1927 |
| 1,807,331 | Wright | May 26, 1931 |
| 1,878,101 | Bradbury | Sept. 20, 1932 |
| 1,930,165 | Gage | Oct. 10, 1933 |
| 2,163,218 | Schlesinger | June 20, 1939 |
| 2,240,123 | Shoup et al. | Apr. 29, 1941 |